United States Patent [19]
Shiratori et al.

[11] Patent Number: 5,952,729
[45] Date of Patent: Sep. 14, 1999

[54] WIRING STRUCTURE IN MOTORCYCLE

[75] Inventors: Toshihiko Shiratori; Hiroshi Sakamoto; Masazumi Igarashi, all of Saitama, Japan

[73] Assignee: Toyo Denso Kabushiki Kaisha, Tokyo, Japan

[21] Appl. No.: 08/974,504

[22] Filed: Nov. 19, 1997

[51] Int. Cl.[6] .................................................. H02B 1/04
[52] U.S. Cl. ............................................ 307/9.1; 361/648
[58] Field of Search .................................. 307/9.1, 10.1, 307/147; 361/600, 601, 622, 624, 641–648, 664, 668, 752, 775; 340/427; 219/204; 362/473–476

[56] References Cited

U.S. PATENT DOCUMENTS

| | | | |
|---|---|---|---|
| 4,229,662 | 10/1980 | Nashimoto | 307/9.1 |
| 4,386,278 | 5/1983 | Kawada et al. | 307/9.1 |
| 4,471,209 | 9/1984 | Hollander | 219/204 |
| 5,255,155 | 10/1993 | Sugimoto et al. | 361/752 |
| 5,627,409 | 5/1997 | Nishitani | 307/10.1 |
| 5,808,373 | 9/1998 | Hamaninshi et al. | 307/10.1 |
| 5,889,337 | 3/1999 | Ito et al. | 307/10.1 |

FOREIGN PATENT DOCUMENTS 60-244680  12/1985  Japan .

*Primary Examiner*—Richard T. Elms
*Attorney, Agent, or Firm*—Nikaido, Marmelstein, Murray & Oram LLP

[57] ABSTRACT

A junction box 2 is formed at a mounting portion of a meter unit 3 disposed at a central portion of a rear handlebar cover 1 in a motorcycle, and wire harnesses 12 and 14 connected to a vehicle body and a front handlebar cover are connected to the junction box 2. Bus bars 31 and 33 made of a metal plate or bar are integrally embedded within the rear handlebar cover made of a synthetic resin in order to electrically connect electric parts such as switches Ss, Sd, Sw, Sh and the like supported on left and right portions of the rear handlebar cover 1 and the junction box 2 to each other. Thus, it is possible to easily and reliably perform the wiring to the electric parts supported on the handlebar cover 1 in the motorcycle.

4 Claims, 11 Drawing Sheets

WIRING STRUCTURE IN MOTORCYCLE

BACKGROUND OF THE INVENTION

1. Field of the Invention

The present invention relates to a wiring structure in a motorcycle, which is designed so that an electric current is supplied through a conductor to an electric part supported in a handlebar cover for covering a handlebar in the motorcycle.

2. Description of the Related Art

Such a wiring structure in the motorcycle is known, for example, from Japanese Patent Application Laid-open No.60-244680. In the above known structure, a switch is mounted in the handlebar cover for covering the handlebar of the motorcycle and wired to another electric part by use of a wire harness.

However, the above known structure suffers from a problem that the number of parts is increased for performing the wiring using the wire harness, but also the number of working steps is increased because of a troublesome operation for attaching and detaching connectors at opposite ends of the wire harness during assembling.

SUMMARY OF THE INVENTION

Accordingly, it is an object of the present invention to provide a wiring structure in a motorcycle, wherein the wiring for electric parts supported in the handlebar cover can be easily and reliably performed.

To achieve the above object, according to a first aspect and feature of the present invention, there is provided a wiring structure in a motorcycle, for supplying an electric current through a conductor to an electric part supported in a handlebar cover for covering a handlebar in the motorcycle, wherein the conductor is formed of a bus bar made of a metal plate or a metal bar embedded in the handlebar cover.

With the above construction, it is possible to reduce the number of parts and the number of steps required for the wiring, as compared with the case where the wire harness is used. Further, it is possible not only to decrease the possibility of occurrence of a short-circuiting, a breaking of a wire, a mis-assembling and the like, but also to enhance the durability of the bus bar used for a long period, as compared with the wire harness.

According to a second aspect and feature of the present invention, in addition to the first feature, a meter unit is disposed at a substantially central portion of the handlebar cover, and the bus bar connected to the electric part is connected to a junction box which is mounted on a mounting portion of the meter unit and to which a connector of a wire harness is connected.

With the above construction, in addition to the effect provided by the first feature, a plurality of bus bars can be disposed radiately about the junction box to avoid the interference with one another, and the entire length of such bus bars can be suppressed to the minimum.

According to a third aspect and feature of the present invention, there is provided a wiring structure in a motorcycle, for supplying an electric current through a conductor to an electric part supported in a handlebar cover for covering a handlebar in the motorcycle, wherein a bus bar-embedded substrate is mounted within the handlebar cover, and the conductor is formed of a bus bar made of a metal plate or a metal bar-embedded in the bus bar-embedded substrate.

With the above construction, in addition to the effect provided by the first feature, it is easy to produce the handlebar cover, leading to a reduced cost.

According to a fourth aspect and feature of the present invention, there is provided a wiring structure in a motorcycle, for supplying an electric current through a conductor to an electric part supported in a handlebar cover for covering a handlebar in the motorcycle, wherein a meter unit, to which a connector of a wire harness is connected, is mounted at a substantially central portion of the handlebar cover, and a bus bar-embedded substrate having a base of a synthetic resin and bus bar made of a metal plate or a metal bar embedded within the base, the bus bar-embedded substrate being connected at one of opposite ends thereof to the meter unit and fixed at the other end thereof to an inner surface of the handlebar cover, the electric part being fixed to the bus bar-embedded substrate by inserting the electric part into an opening defined in the handlebar cover.

With the above construction, the bus bar-embedded substrate is used which has the bus bar made of a metal plate or metal bar embedded within the base of synthetic resin in place of the conventional wire harness. Therefore, it is possible to decrease the possibility of occurrence of a short-circuiting, a breaking of a wire, a mis-assembling and the like, but also to enhance the durability of the bus bar used for a long period, as compared with the wire harness. Moreover, a plurality of bus bars can be disposed radiately of the bus bar-embedded substrate from the meter unit mounted at the substantially central portion of the handlebar cover to avoid the interference with one another, and the entire length of the bus bars can be suppressed to the minimum. In addition, since such bus bars are to be embedded in the bus bar-embedded substrate mounted within the handlebar cover, it is easy to produce the handlebar cover, leading to a reduced cost. Further, the fixing and connection of the electric part are simultaneously completed, only by inserting the electric part through an opening in the handlebar cover, after the handlebar cover having the bus bar-embedded substrate previously mounted therein is fixed to a vehicle body. This leads to an enhanced assembling workability and a decreased number of assembling steps.

The above and other objects, features and advantages of the invention will become apparent from the following description of the preferred embodiments taken in conjunction with the accompanying drawings.

BRIEF DESCRIPTION OF THE DRAWINGS

FIGS. 1 to 7 illustrate a first embodiment of the present invention, wherein

FIG. 1 is an exploded perspective view taken from the front of a rear handlebar cover in a motorcycle;

FIG. 2 is an enlarged view taken in the direction of an arrow 2 in FIG. 1;

FIG. 3 is a sectional view taken along a line 3—3 in FIG. 2;

FIG. 4 is a sectional view taken along a line 4—4 in FIG. 3;

FIG. 5 is a sectional view taken along a line 5—5 in FIG. 4;

FIG. 6 is an exploded perspective view of a starter switch;

FIG. 7 is a diagram for explaining a wiring provided by bus bars;

FIGS. 9 to 12 illustrate a third embodiment of the present invention, wherein

FIG. 9 is an exploded perspective view taken from the front of a rear handlebar cover in a motorcycle;

FIG. 10 is a view similar to FIG. 3;

FIG. 11 is a sectional view taken along a line 11—11 in FIG. 10; and

FIG. 12 is a sectional view taken along a line 12—12 in FIG. 11.

DETAILED DESCRIPTION OF THE PREFERRED EMBODIMENTS

The present invention will now be described by way of embodiments with reference to the accompanying drawings.

A first embodiment of the present invention will be first described with reference to FIGS. 1 to 7.

Figure 1:
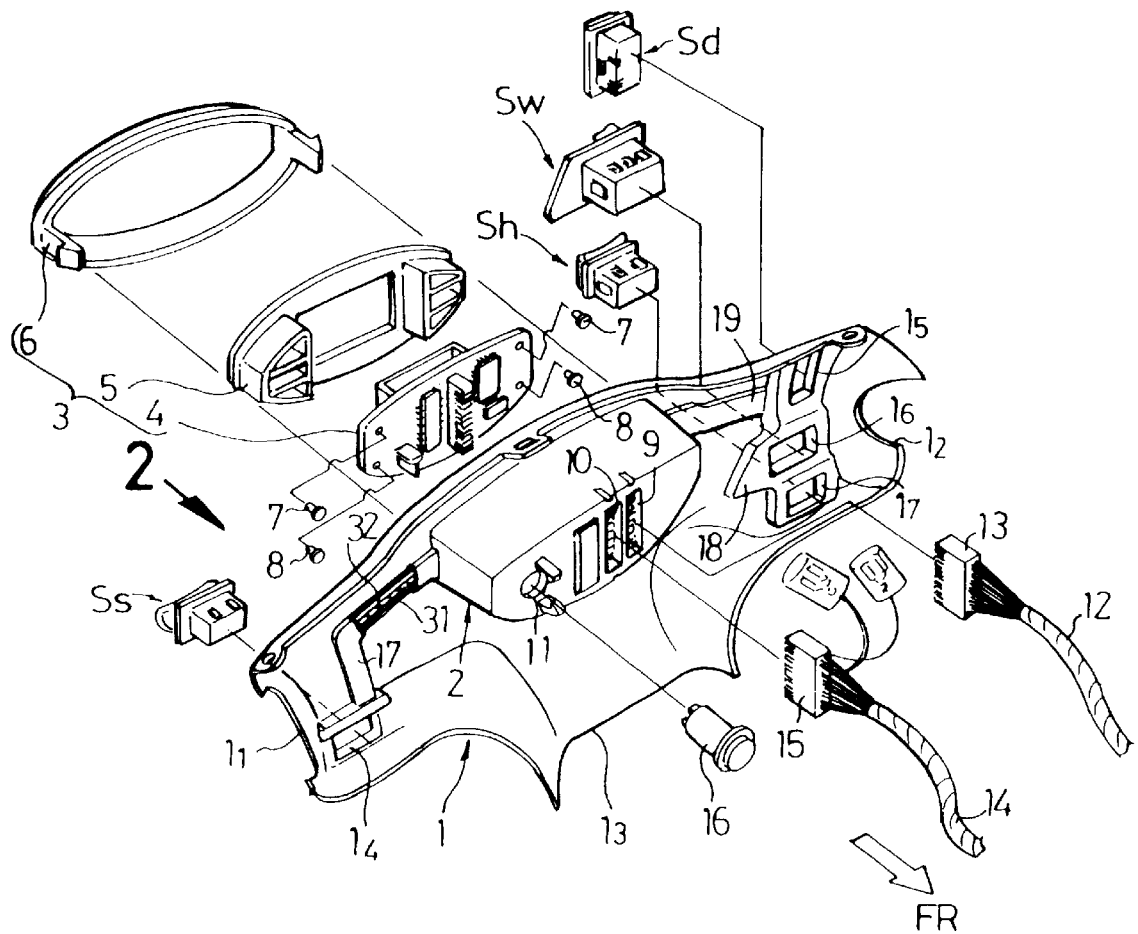
Figure 2:
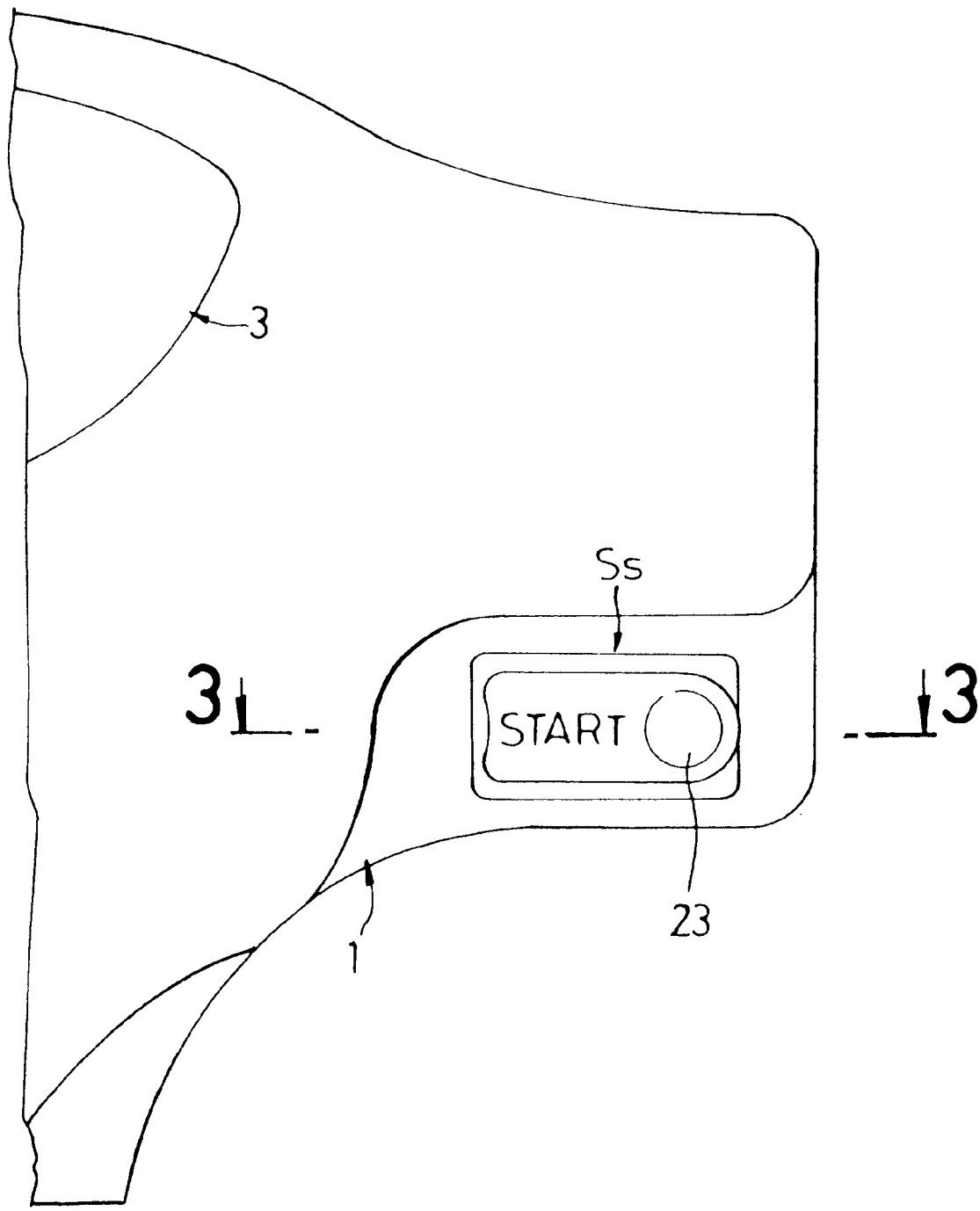
Figure 3:
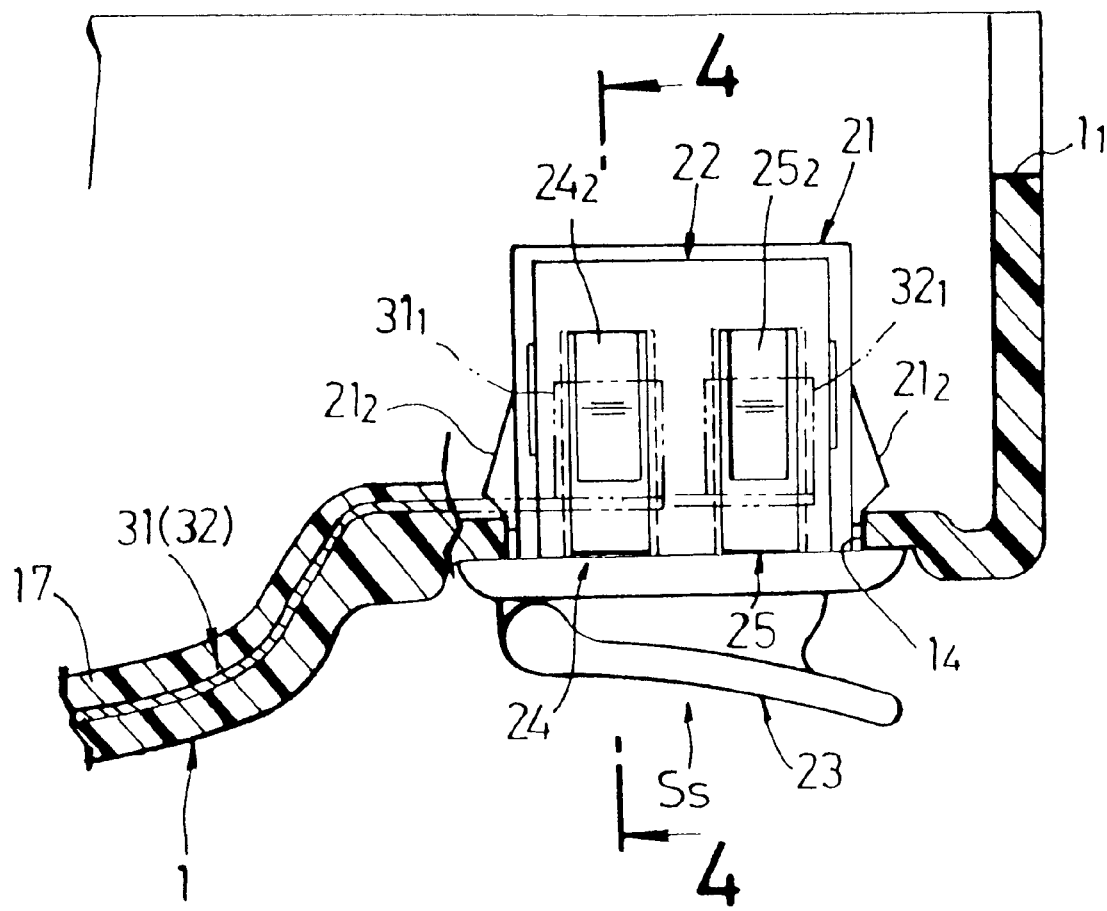
Figure 4:
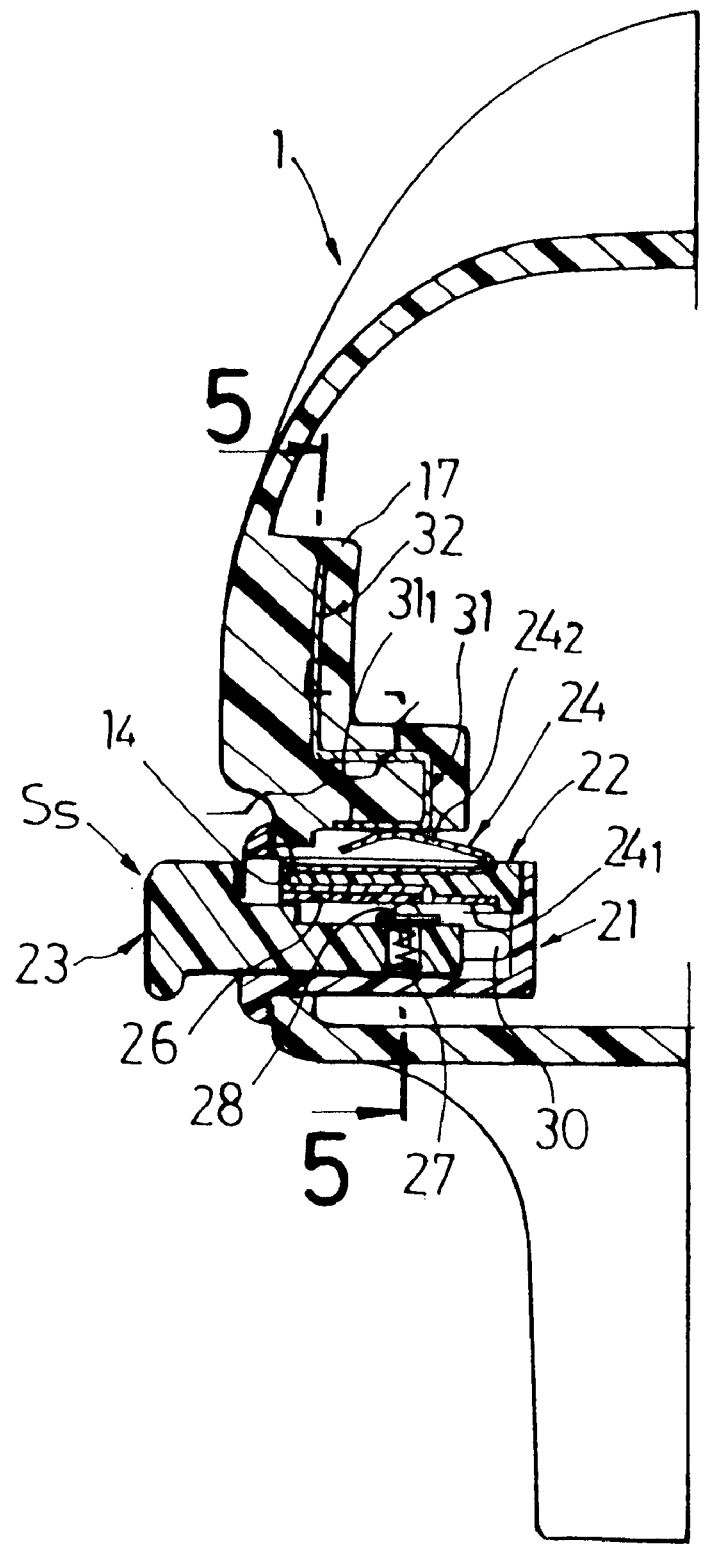
Figure 5:
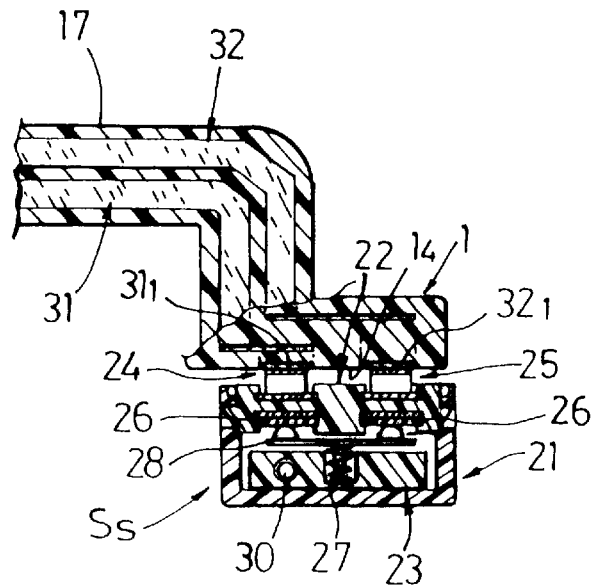
Figure 6:
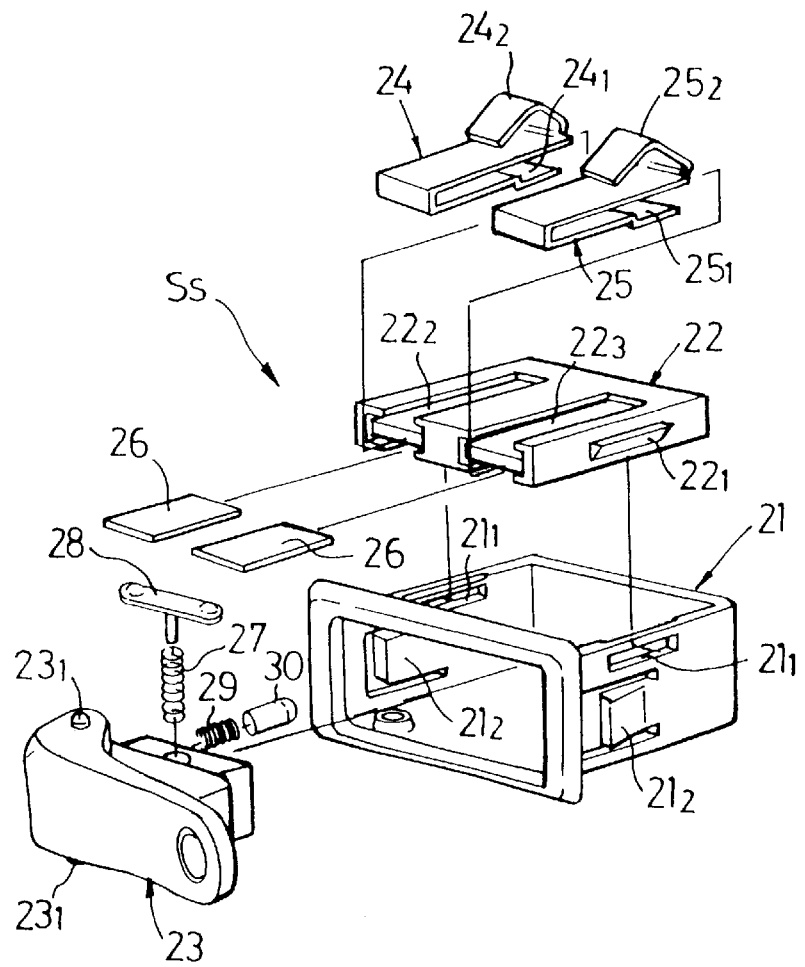
Figure 7:
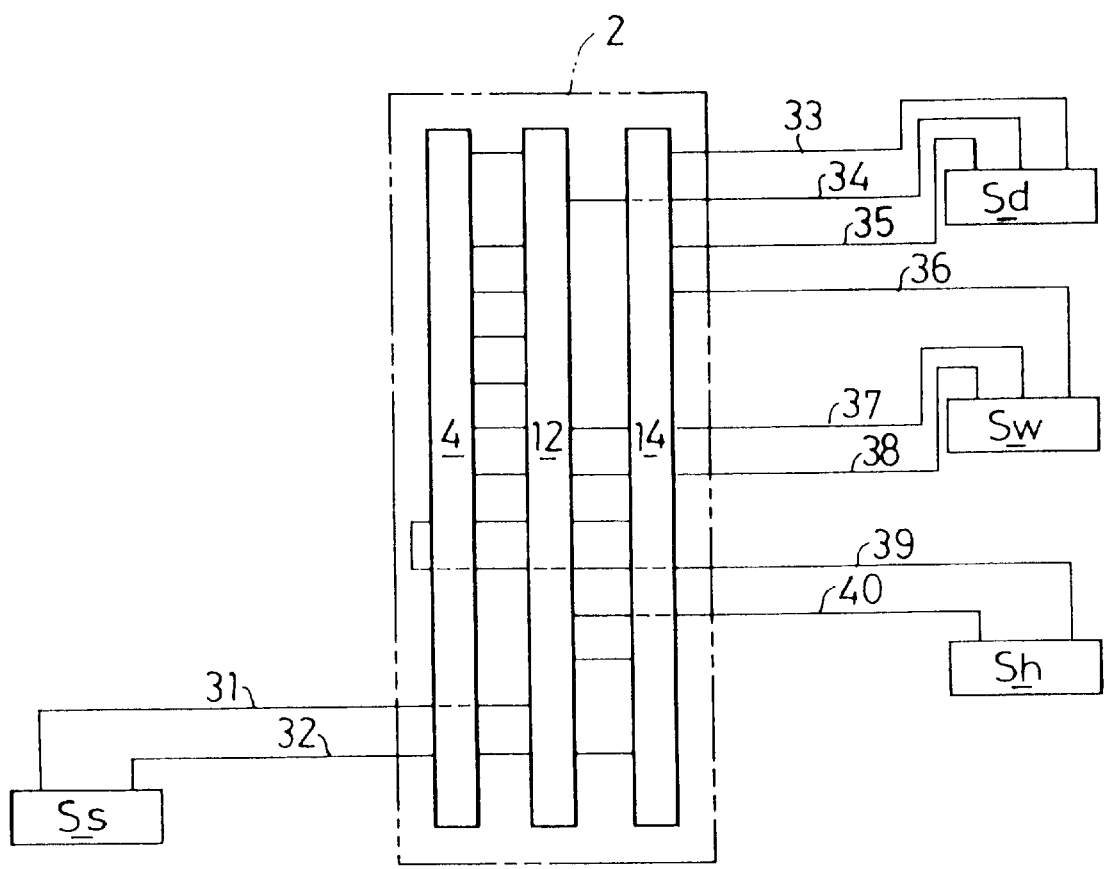

In FIG. 1, reference character 1 is a rear handlebar cover made of a synthetic resin for covering a rear portion of a handlebar of a motorcycle. The handlebar cover 1 has a notch $1_1$ which is defined at a right end thereof as viewed from a rider and through which a right half of the handlebar is passed, a notch $1_2$ which is defined at a left end thereof and through which a left half of the handlebar 1 is passed, and a notch $1_3$ which is a lower end thereof and through which a steering shaft is passed. A junction box 2 is integrally formed at a central portion of the rear handlebar cover 1 to protrude a forwards of a vehicle body, and a meter unit 3 is mounted to the junction box 2 from the rearward of the vehicle body. The meter unit 3 is comprised of a meter body 4 including a print board having electronic parts such as IC and a liquid crystal display mounted therein, a meter indicating plate 5 and a mater lens 6. A pair of left and right turn-signal bulbs 7, 7 and a pair of left and right illuminating bulbs 8, 8 are mounted in the meter body 4.

Three connectors 9, 10 and 11 are mounted in a front surface of the junction box 2. A connector 13 of a main harness 12 connected to a battery or a starter motor mounted on the vehicle body is coupled to the connector 9. A connector 15 of a front handlebar cover harness 14 connected to a head light or winker lamp in a front handlebar cover mounted to the front surface of the rear handlebar cover 1 is coupled to the connector 10. A winker relay 16 is coupled to the connector 11.

A starter switch Ss is mounted in an opening $1_4$ defined in a right portion of the rear handlebar cover 1. A first bus bar-embedding substrate 17 is projecting provided in a band-like shape on an inner surface of the rear handlebar cover 1 to connect the opening 14 in the starter switch $S_s$ and the junction box 2 to each other. Three openings $1_5$, $1_6$ and $1_7$ for mounting of a dimmer switch Sd, a winker switch Sw and a horn switch Sh are defined in a left portion of the rear handlebar cover 1. A second bus bar embedding substrate 18 is projecting provided on the inner surface of the rear handlebar cover 1 to surround the three openings $1_5$, $1_6$ and $1_7$. Further, a third bus bar embedding substrate 19 is projecting provided on the inner surface of the rear handlebar cover 1 to connect the second bus bar embedding substrate 18 and the junction box 2. A plurality of bus bars which will be described hereinafter are embedded in each of the bus bar embedding substrates 17, 18 and 19. The starter switch Ss, the dimmer switch Sd, the winker switch Sw and the horn switch Sh are connected to the inside of the junction box 2 through these bus bars.

The structures of the starter switch Ss and the bus bars will be described below with reference to FIGS. 2 to 6.

The starter switch Ss includes a switch housing 21 which opens at its upper and front surfaces. A contact holder 22 is fitted in an opening in the upper surface of the switch housing 21 and fixed by bringing projections $22_1$, $22_1$ provided on a side of the contact holder 22 into engagement in locking bores $21_1$, $21_1$, in the switch housing 21. A switch lever 23 is fitted into an opening in the front surface of the switch housing 21 and swingably supported by bringing a pair of upper and lower pins $23_1$, $23_1$ projecting provided at one end of the switch lever 23 into engagement with the switch housing 21 and the contact holder 23, so that the switch lever 23 can be swung about the pins $23_1$, $23_1$.

A pair of stationary contacts 24 and 25 made by bending a metal plate are fitted into a pair of contact support portions $22_2$ and $22_3$ formed in the contact holder 22. A portion of a lower surface of each of the stationary contacts 24 and 25 is covered with each of plate-like insulators 26, 26, with contact portions $24_1$ and $25_1$ of the stationary contacts 24 and 25 being exposed in turned-down states at locations adjoining the insulators 26, 26. A movable contact 28 biased upwards by a spring 27 is vertically slidably carried on an upper surface of the switch lever 23. The movable contact 28 is slidable over the insulators 26, 26 and the contact portions $24_1$ and $25_1$. A pin 30 biased forwards by a spring 29 protrudes for advancing and retreating movements from a back of the switch lever 23, so that a tip end of the pin 30 resiliently abuts against the inner surface of the switch housing 21. The resilient force of the spring 29 acts to push back the other end of the switch lever 23.

Therefore, when the other end of the switch lever 23 is urged in order to turn ON the starter switch Ss, the movable contact 28 mounted on the switch lever 23 is moved from on the insulators 26, 26 onto the pair of contact portions $24_1$ and $25_1$ of the stationary contacts 24 and 25 to allow the pair of contact portions $24_1$ and $25_1$ to conduct. When the urging of the other end of the switch lever 23 is released, the switch lever 23 is automatically restored to an OFF position by the resilient force of the spring 29.

Two bus bars 31 and 32 made of a band-like metal plate are embedded in the first bus bar embedding substrate 17 (see FIG. 1). The bus bars 31 and 32 are incorporated in the rear handlebar cover 1 when the rear handlebar cover 1 is produced by an injection molding. Terminals $31_1$ and $32_1$ formed at one ends of the bus bars 31 and 32 are exposed in the vicinity of the opening $1_4$ in the rear handlebar cover 1. Terminals $24_2$ and $25_2$ having a resilience and formed by folding the stationary contacts 24 and 25 of the starter switch Ss abut against the terminals $31_1$ and $32_1$.

When the starter switch Ss is inserted into the opening $1_4$ in the rear handlebar cover 1, two locking claws $21_2$, $21_2$ formed on the switch housing 21 are engaged with edges of the openings $1_4$, whereby the starter switch Ss is fixed to the rear handlebar cover 1 and at the same time, the connection of the starter switch Ss and the bus bars 31 and 32 is automatically completed. Moreover, a reliable electric conduction is ensured by the resilience of the terminals $24_2$ and $25_2$. In this way, means such as a bolt, a connector, a soldering and the like is not used for fixing and wiring of the starter switch Ss, and hence, it is possible to reduced the number of parts and the number of assembling steps.

Each of the dimmer switch Sd, the winker switch Sw and the horn switch Sh also is mounted to the rear handlebar cover 1 in a structure similar to that of the starter switch Ss. A plurality of bus bars for connecting each of the dimmer switch Sd, the winker switch Sw and the horn switch Sh to the junction box 2 are also embedded in each of the second and third bus bar embedding substrates 18 and 19. More specifically, as can be seen from FIG. 7, the two bus bars 31 and 32 extending from the starter switch Ss, three bus bars 33, 34 and 35 extending from the dimmer switch Sd, three bus bars 36, 37 and 38 extending from the winker switch Sw and two bus bars 39 and 40 extending from the horn switch Sh are connected to the meter body 4, the main harness 12 and the front handlebar harness 14 in the junction box 2.

In the above manner, the wiring to the electric parts including the starter switch Ss, the dimmer switch Sd, the winker switch Sw and the horn switch Sh mounted to the rear handlebar cover 1 of the motorcycle is performed by the bus bars 31 to 40 embedded in the rear handlebar cover 1. Therefore, as compared with the case where the conventional wire harnesses are used, it is possible not only to substantially reduce the numbers of parts and steps required for the wiring, but also to decrease the possibility of occurrence of a short-circuiting, breaking, mis-assembling and the like. Moreover, it is possible to enhance the durability of the bus bars used for a long period, as compared with the wire harnesses. Further, since the junction box 2 is mounted on the mounting portion for the meter unit 3 located at the central section of the rear handlebar cover 1, and the bus bars 31 to 40 are disposed radiately about the junction box 2, it is possible to suppress the entire length of the bus bars 31 to 40 to the minimum, while avoiding the mutual interference of the bus bars 31 to 40.

Figure 8:
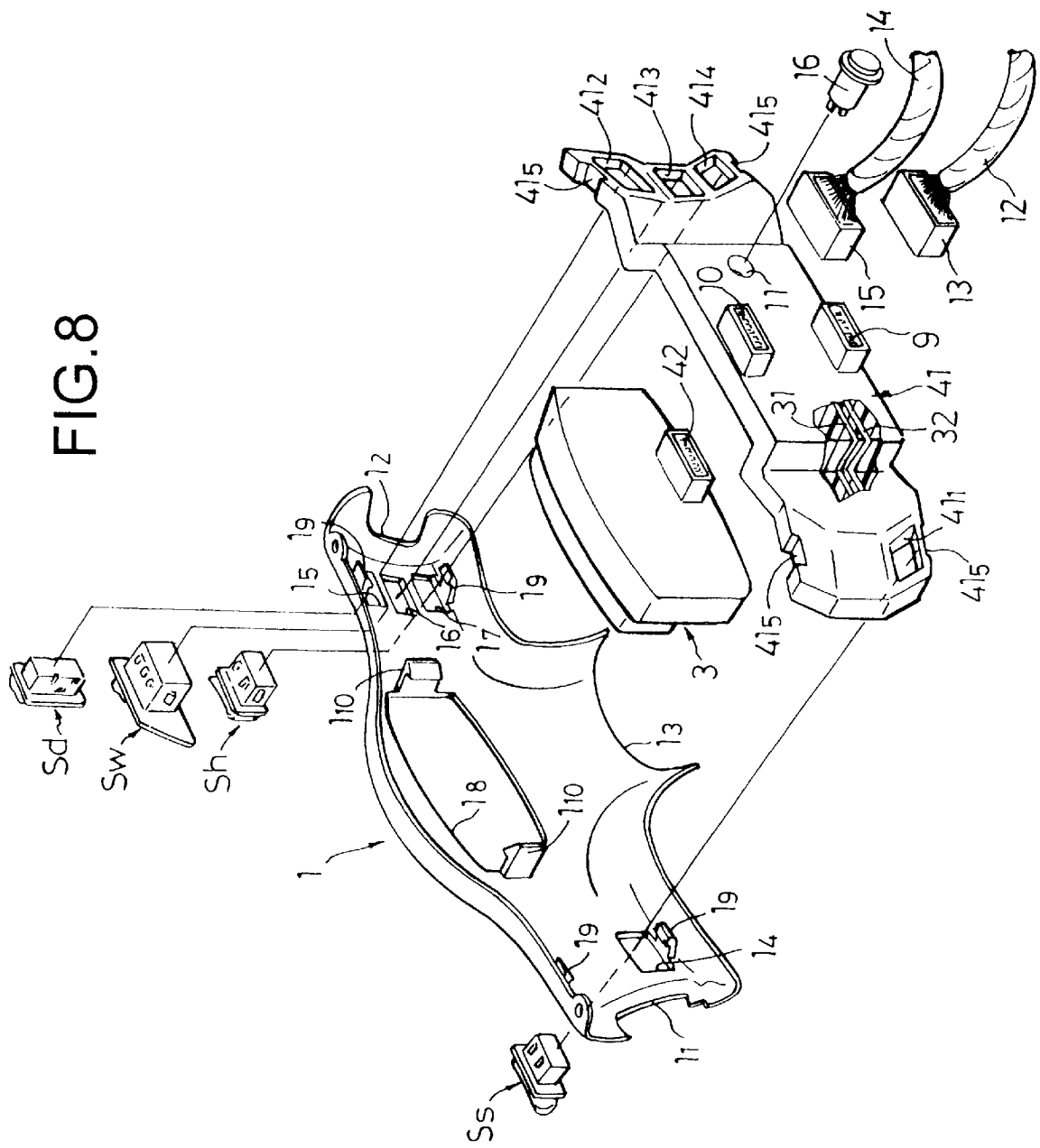
FIG. 8 is an exploded perspective view taken from the front of a rear handlebar cover in a motorcycle according to a second embodiment of the present invention.

A second embodiment of the present invention will now be described with reference to FIG. 8. In the second embodiment shown in FIG. 8, the same reference characters as those in the first embodiment are affixed to members, portions or components corresponding to those in the first embodiment.

The second embodiment includes a bus bar embedding substrate 41 made of a synthetic resin and locked and fixed with its four locking recesses 41$_5$ locked in four locking claws 1$_9$ projecting provided on an inner surface of a rear handlebar cover 1. Nine bus bars 31 to 40 (only bus bars are shown) are integrally embedded in the bus bar embedding substrate 41. The bus bar embedding substrate 41 includes four openings 41$_1$, 41$_2$, 41$_3$ and 41$_4$ corresponding to the four openings 1$_4$, 1$_5$, 1$_6$ and 1$_7$ in the rear handlebar cover 1. The starter switch Ss, the dimmer switch Sd, the winker switch Sw and the horn switch Sh are passed through the openings 1$_4$, 1$_5$, 1$_6$ and 1$_7$ in the rear handlebar cover 1 and locked in the openings 41$_1$, 41$_2$, 41$_3$ and 41$_4$ in the bus bar embedding substrate 41, where the switches Ss, Sd, Sw and Sh are connected by the bus bars 31 to 40 in a structure similar to that in the first embodiment.

Further, the meter unit 3 fitted in the opening 1$_8$ defined at the center of the rear handlebar cover 1 and fixed by two locking claws 1$_{10}$, 1$_{10}$ is coupled to the bus bar embedding substrate 41 through a connector 42 mounted on a back of the meter unit 3. The connector 13 of the main harness 12, the connector 15 of the front handlebar cover 14 and the winker relay 16 are coupled to three connectors 9, 10 and 11 provided on the bus bar embedding substrate 41.

Thus, in addition to the operational effect of the first embodiment, the second embodiment can provide an operational effect which will be described below. Since the bus bars 31 to 40 are embedded in the bus bar embedding substrate 41 mounted to the rear handlebar cover 1, rather than being embedded directly in the rear handlebar cover 1, it is possible to simplify the structure of a die for producing the rear handlebar cover 1 by an injection molding to reduce the cost.

A third embodiment of the present invention will be described with reference to FIGS. 9 to 12.

Figure 9:
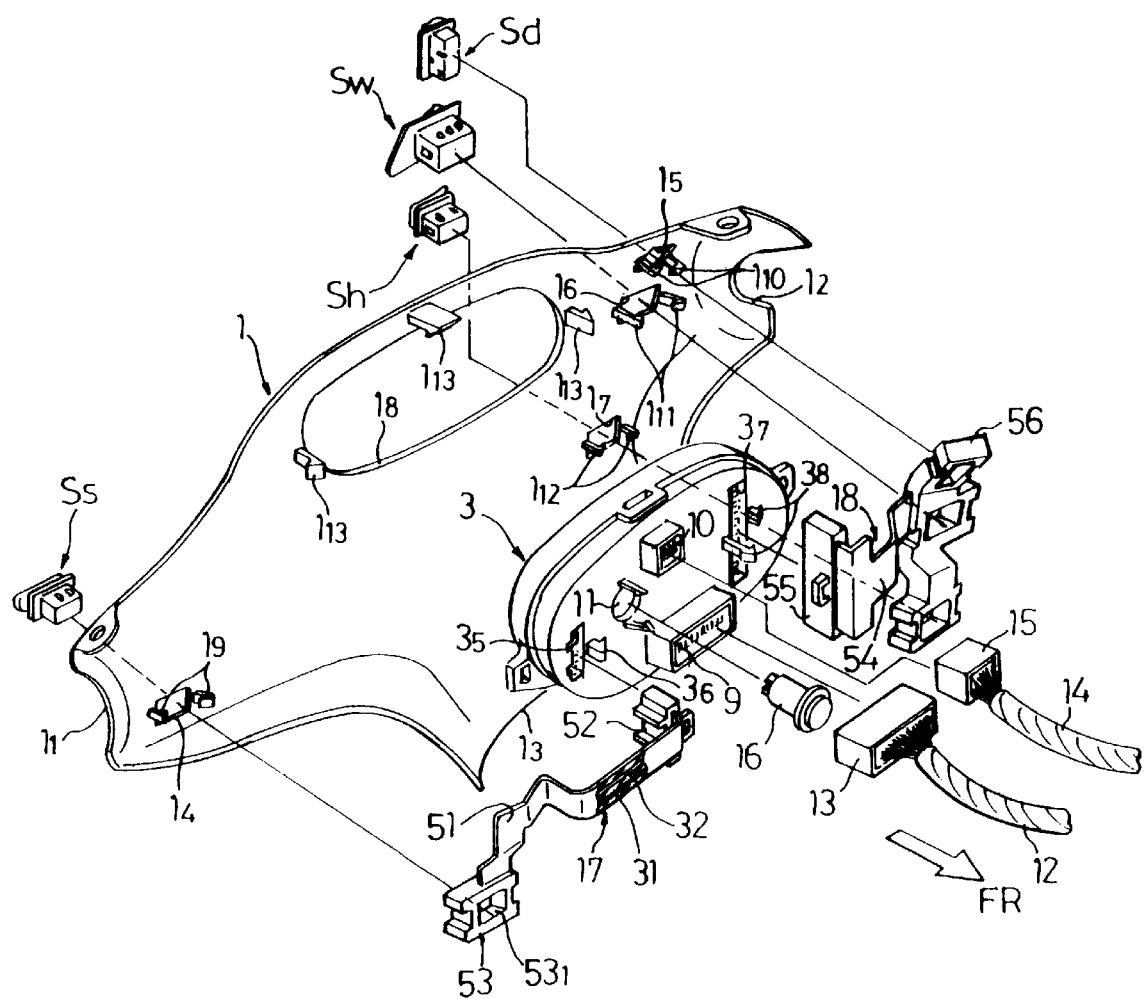

Referring to FIG. 9, a meter unit 3 fitted into an opening 1$_8$ defined at the central portion of the rear handlebar cover 1 is fixed by three locking claws 1$_{13}$ provided around the opening 1$_8$. Three connectors 9, 10 and 11 are mounted on the front surface of the meter unit 3. A connector 13 of a main harness 12 connected to a battery or a starter motor mounted on a vehicle body is coupled to the connector 9. A connector 15 of a front handlebar cover harness 14 connected to a headlight or winker lamp in the front handlebar cover counted on the front surface of the rear handlebar cover 1 is connected to the connector 10, and a winker relay 16 is coupled to the connector 11.

The starter switch Ss is fitted in an opening 1$_4$ defined in a right portion of the handlebar cover 1, and the starter switch Ss and the meter unit 3 are interconnected by a first bus bar embedding substrate 17. Three openings 1$_5$, 1$_6$ and 1$_7$ are defined in a left portion of the rear handlebar cover 1, and the dimmer switch Sd, the winker switch Sw and the horn switch Sh are fitted in the openings 1$_5$, 1$_6$ and 1$_7$. The three switches Sd, Sw and Sh and the meter unit 3 are connected together by a second bus bar embedding substrate 18. As can be seen from FIGS. 10 to 12, the structure of the starter switch Ss is substantially the same as that in the first embodiment.

Figure 10:
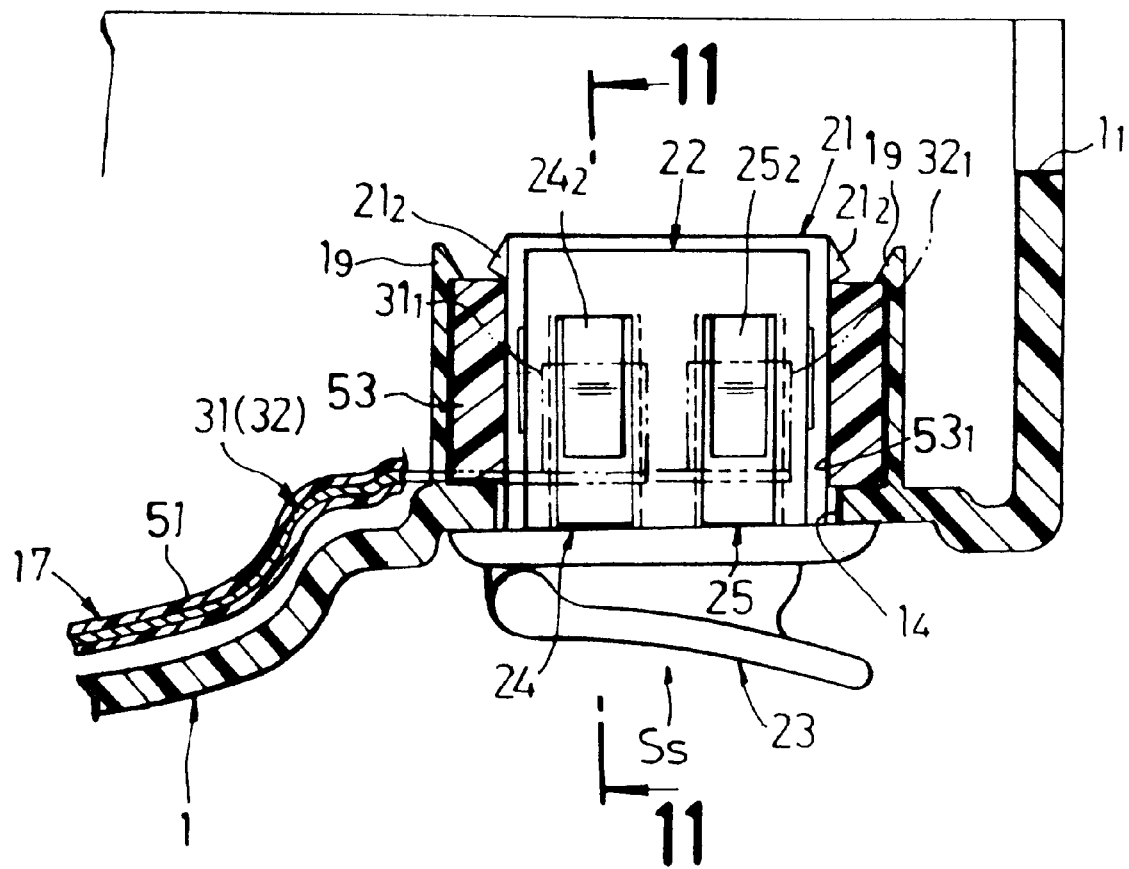
Figure 11:
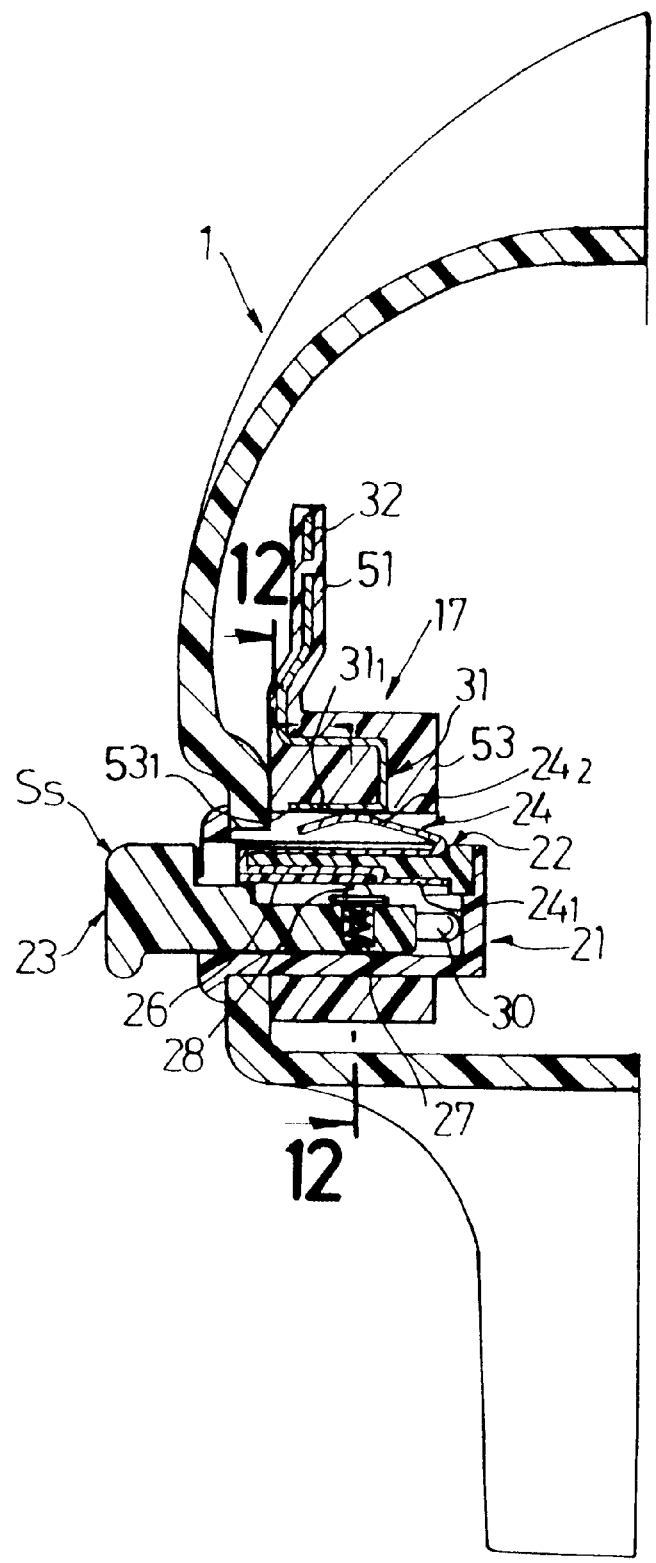
Figure 12:
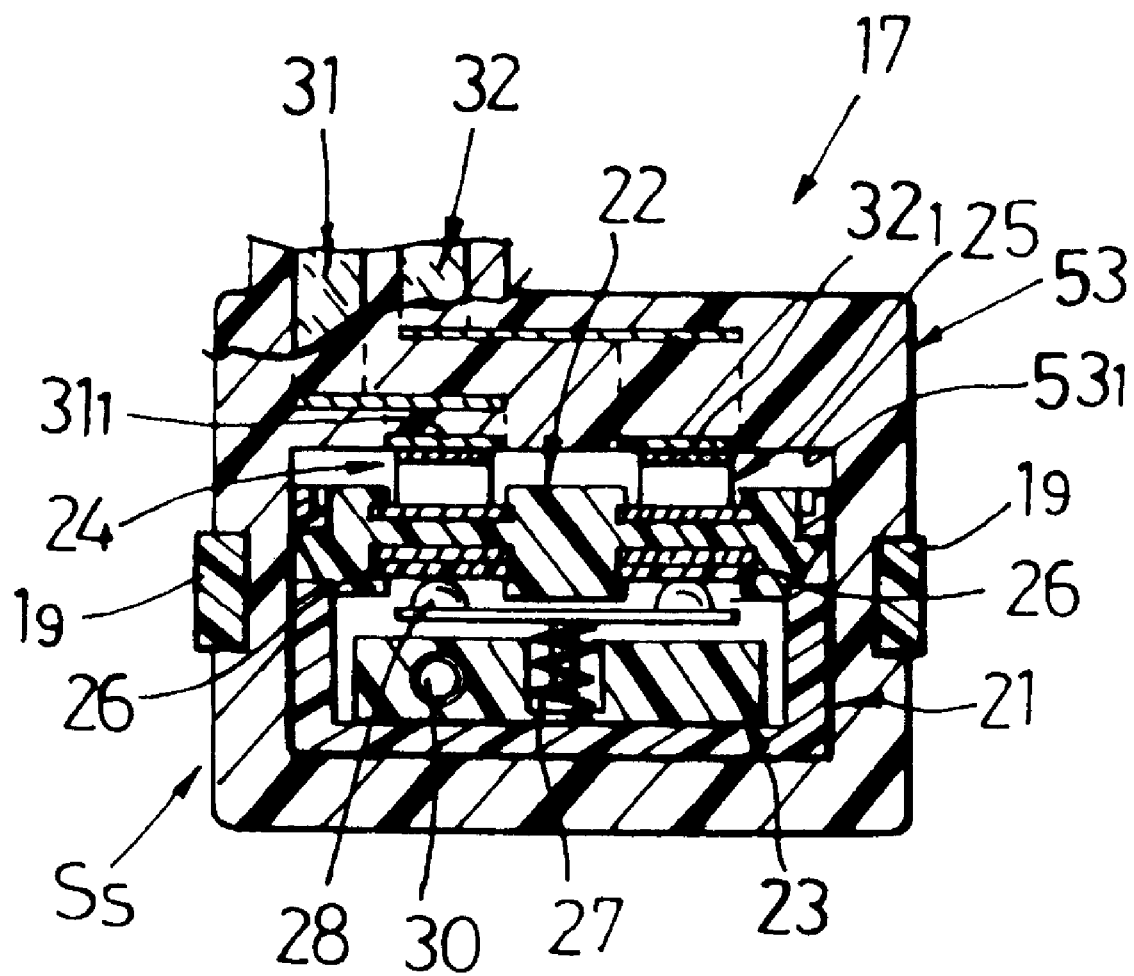

The structure of the first bus bar embedding substrate 17 will be described below with reference to FIGS. 10 to 12.

The first bus bar embedding substrate 17 is provided with a bus bar embedding portion 51 having a flexibility and formed into a thin plate-like shape from a synthetic resin. Two bus bars 31 and 32 made of a band-like metal plate are embedded in the bus bar embedding portion 51. When the first bus bar embedding substrate 17 is produced by an injection molding, the bus bars 31 and 32 are incorporated in the first bus bar embedding substrate 17. A connector 52 integrally formed at one end of the bus bar embedding portion 51 is fitted into an opening 3$_5$ defined in the meter unit 3 and locked therein by a locking claw 3$_6$ (see FIG. 9). A switch portion 53 integrally formed at the other end of the bus bar embedding portion 51 superposed to an edge of the opening 1$_4$ defined in the rear handlebar cover 1 and locked thereto by two locking claws 1$_9$, 1$_9$ provided around the opening 1$_4$ (see FIG. 9).

An opening 53$_1$ is provided through the switch support portion 53 of the first bus bar embedding substrate 17, and the starter switch Ss is fitted into the opening $^{53}$$_1$. Terminals 31$_1$ and $^{32}$$_1$ formed at one ends of bus bars 31 and 32 embedded in the bus bar embedding portion 51 are exposed to the opening 53$_1$. When the starter switch Ss is inserted into the opening 53$_1$ in the switch support portion 53 of the first bus bar embedding substrate 17, two locking claws 21$_2$, 21$_2$ formed on the switch housing 21 are brought into engagement with the edge of the opening $^{53}$$_1$ to fix the starter switch Ss to the first bus bar embedding substrate 17. At this time, the terminals 24$_2$ and 25$_2$ having the resilience and formed by folding the stationary contacts 24 and 25 of the starter switch Ss abut against the terminals 31$_1$ and 32$_1$ of the bus bars 31 and 32, whereby the connection of the starter switch Ss and the bus bars 31 and 32 is automatically completed and moreover, a reliable electric conduction is ensured by the resilience of the terminals 24$_2$ and 25$_2$. In this way, means such as a bolt, a connector, a soldering and the like is not used for fixing and wiring of the starter switch Ss, it is possible to reduce the number of parts and the number of assembling steps.

The second bus bar embedding substrate 18 connecting the dimmer switch Sd, the winker switch Sw and the horn switch Sh to the meter unit 3 also has the substantially same structure as that of the first bus bar embedding substrate 17. The second bus bar embedding substrate 18 includes a bus bar embedding portion 54 having a plurality of bus bars embedded therein, a connector 55 connected to the meter unit 3, and a switch support portion 56 fixed to the rear handlebar cover 1 to support the dimmer switch Sd, the winker switch Sw and the horn switch Sh (see FIG. 9). The connector 55 is fitted into an opening $3_7$ in the meter unit 3 and locked by locking claws $3_8$, $3_8$, and the switch support portion 56 is locked by locking claws $1_{10}$, $1_{10}$; $1_{11}$, $1_{11}$ and $1_{12}$, $1_{12}$ provided on the rear handlebar cover 1.

As described above, the first and second embedding substrates 17 and 18 for performing the wiring for the electric parts including the starter switch Ss, the dimmer switch Sd, the winker switch Sw and the horn switch Sh mounted to the rear handlebar cover 1 of the motorcycle are stable in form and cannot be entangle and wound, as is the wire harness and moreover, have a moderate softness. Therefore, it is easy to mount and detach the first and second embedding substrates 17 and 18, and the first and second embedding substrates 17 and 18 are excellent in assemblability. In addition, as compared with the conventional wire harness, it is possible to decrease the possibility of occurrence of a short-circuiting, a breaking, a misassembling and the like, and to enhance the durability of the bus bars used for a long period.

In addition, since the fixing and wiring of the starter switch Ss, the dimmer switch Sd, the winker switch Sw and the horn switch Sh are simultaneously completed only by inserting these switches Ss, Sd, Sw and Sh into the openings $1_4$ to $1_7$ after the rear handlebar cover 1 and the front handlebar cover to which the first and second bus bar embedding substrates 17 and 18 have been previously mounted are fixed to the vehicle body. This leads to an enhanced assemblability and to a decreased number of assembling steps.

Further, since the first and second bus bar embedding substrates 17 and 18 are disposed radiately about the meter unit 3 located at the central portion of the rear handlebar cover 1, it is possible to suppress the entire length of the bus bars 31 to 41 to the minimum, while avoiding the mutual interference of the first and second bus bar embedding substrates 17 and 18.

Yet further, since the bus bars 31 to 40 are embedded in the first and second embedding substrates 17 and 18 capable of being attached to and detached from the rear handlebar cover 1, rather than being embedded directly on the rear handlebar cover 1, it is possible to simplify the structure of a mold for producing the rear handlebar cover 1 by injection molding to reduce the cost.

Although the embodiments of the present invention have been described in detail, it will be understood that the present invention is not limited to the above-described embodiments, and various modifications in design may be made without departing from the spirit and scope of the invention defined in claims.

For example, each of the bus bars 31 to 40 has been formed from the band-like metal plate in the embodiments, but may be formed into any sectional shape from a metal rod having a circular or polygonal section. The starter switch Ss, the dimmer switch Sd, the winker switch Sw and the horn switch Sh have been illustrated as the electric parts in the embodiments, but according to the present invention, any other electric parts may be utilized. The bus bars 31 to 40 have been embedded in the rear handlebar cover 1 in the first embodiment, but may be embedded in any portion of the handlebar cover.

What is claimed is:

1. A wiring structure in a motorcycle, for supplying an electric current through a conductor to an electric part supported in a handlebar cover for covering a handlebar in the motorcycle, wherein said conductor is formed of a bus bar made of a metal plate or a metal bar embedded in said handlebar cover.

2. A wiring structure in a motorcycle according to claim 1, wherein a meter unit is disposed at a substantially central portion of said handlebar cover, and said bus bar connected to said electric part is connected to a junction box which is mounted on a mounting portion of said meter unit and to which a connector of a wire harness is connected.

3. A wiring structure in a motorcycle, for supplying an electric current through a conductor to an electric part supported in a handlebar cover for covering a handlebar in the motorcycle, wherein a bus bar-embedded substrate is mounted within said handlebar cover, and said conductor is formed of a bus bar made of a metal plate or a metal bar embedded in said bus bar-embedded substrate.

4. A wiring structure in a motorcycle, for supplying an electric current through a conductor to an electric part supported in a handlebar cover for covering a handlebar in the motorcycle, wherein a meter unit, to which a connector of a wire harness is connected, is mounted at a substantially central portion of the handlebar cover, and a bus bar-embedded substrate having a base of a synthetic resin and bus bar made of a metal plate or a metal bar embedded within said base, said bus bar-embedded substrate being connected at one of opposite ends thereof to said meter unit and fixed at the other end thereof to an inner surface of said handlebar cover, said electric part being fixed to said bus bar-embedded substrate by inserting said electric part into an opening defined in said handlebar cover.

* * * * *